(12) United States Patent
Yang (10) Patent No.: US 8,656,429 B2
(45) Date of Patent: Feb. 18, 2014

(54) SYSTEM AND METHOD FOR DISPLAYING AND NAVIGATING A GRAPHICAL TWO-DIMENSIONAL ARRAY OF A PLURALITY OF AVAILABLE CHANNELS

(75) Inventor: Hsi-Heng Sean Yang, Milpitas, CA (US)

(73) Assignee: Toshiba America Electronic Components, Inc., Irvine, CA (US)

( * ) Notice: Subject to any disclaimer, the term of this patent is extended or adjusted under 35 U.S.C. 154(b) by 630 days.

(21) Appl. No.: 12/269,361

(22) Filed: Nov. 12, 2008

(65) Prior Publication Data

US 2009/0260035 A1 Oct. 15, 2009

Related U.S. Application Data

(60) Provisional application No. 61/043,536, filed on Apr. 9, 2008.

(51) Int. Cl.
*G06F 3/00* (2006.01)
*G06F 13/00* (2006.01)
*H04N 5/445* (2011.01)

(52) U.S. Cl.
USPC .............................................. 725/44; 725/43

(58) Field of Classification Search
USPC ...................................................... 725/37–61
See application file for complete search history.

(56) References Cited

U.S. PATENT DOCUMENTS

| | | | |
|---|---|---|---|
| 6,734,909 B1* | 5/2004 | Terane et al. | 348/333.05 |
| 7,765,569 B2* | 7/2010 | MacBeth et al. | 725/39 |
| 2003/0016304 A1* | 1/2003 | Norsworthy et al. | 348/565 |
| 2003/0159143 A1* | 8/2003 | Chan | 725/41 |
| 2004/0060061 A1* | 3/2004 | Parker | 725/38 |
| 2005/0071782 A1* | 3/2005 | Barrett et al. | 715/838 |
| 2005/0188402 A1* | 8/2005 | de Andrade et al. | 725/46 |
| 2006/0197870 A1* | 9/2006 | Habas et al. | 348/565 |
| 2008/0155605 A1* | 6/2008 | Jeon | 725/47 |

\* cited by examiner

*Primary Examiner* — Bennett Ingvoldstad
(74) *Attorney, Agent, or Firm* — Tucker Ellis LLP (57) ABSTRACT

The subject application is directed to a system and method for displaying and navigating a graphical two-dimensional array of a plurality of available channels on an associated display unit. A two-dimensional array of channel boxes is first generated on an associated display. Input signals are then received corresponding to a respective plurality of available channels. At least one of the received input signals is then parsed to acquire channel identification data indicating at least one channel associated with the parsed signal. Image data associated with the indicated channel is then captured. Thereafter, at least one channel box is populated in the array with the acquired identification data and the captured image data.

20 Claims, 9 Drawing Sheets

SYSTEM AND METHOD FOR DISPLAYING AND NAVIGATING A GRAPHICAL TWO-DIMENSIONAL ARRAY OF A PLURALITY OF AVAILABLE CHANNELS

CROSS-REFERENCE TO RELATED APPLICATIONS

This application claims priority to U.S. Provisional Patent Application No. 61/043,536, filed Apr. 9, 2008, titled "SYSTEM AND METHOD FOR DISPLAYING AND NAVIGATING A GRAPHICAL TWO-DIMENSIONAL ARRAY OF A PLURALITY OF AVAILABLE CHANNELS", the entirety of which is incorporated herein.

BACKGROUND OF THE INVENTION

The subject application is directed to a system and method for displaying channel information and visual content in a two-dimensional array. More particularly, the subject application is directed to a system and method for using a two-dimensional interface with a combined intuitive navigation paradigm to improve channel browsing and selection. In particular, the subject application is directed to a system and method for displaying and navigating a graphical two-dimensional array of a plurality of available channels on an associated display unit.

With arrival of cable and digital televisions, the number of channels accessible to a user has dramatically increased. Separately, digital channel numbers are represented in two parts to denote major and minor channel numbers, e.g. 11.1 and 11.2. Efficient channel selection is becoming an important issue to consider for television makers. There are two traditional methods for tuning to a channel: using the channel up/down keys to tune to the previous channel or the next channel in a linear sequence and typing in the channel number. The first method offers linear access to channels; thus, if there are one hundred channels between the current channel and the desired channel, the user is required to press the channel up/down key 100 times, or press and hold the key for an extended period of time. The second method requires the user to memorize the channel number. This can be challenging when working with digital broadcasting because of the large values (channel numbers may go up to the hundreds) and number (most stations broadcast in multiple minor channels). For example, KQED (PBS) in the San Francisco Bay area broadcasts channels 9, 9.1, 9.2, 9.3, 9.4, and 9.5. In the San Jose area, there exist nearly 60 available channels broadcast over the air, and even more via cable or other services.

Current attempts to ease this burden on consumers include television software that provides favorite channel lists, channel labels, and the like so as to aid in channel browsing and selection. The favorite channel lists stores a list of user-defined channels, so that by bringing up the list the user can then select desired channel. This can work to a certain extent, until the list grows so large that it transforms to the very same problem as before. Channel labels may also help the user identify the content of the channel. For example, if a channel is affiliated with CBS network, the user can type in a label "CBS." Having done this, the next time the user cycles through all of the channels, the label will identify the station so that the user knows it is the desired channel. However, this mechanism requires the user to first define the channel labels. This effort increases with the number of available channels, not to mention the research required to label a channel.

Today's advanced television units include rear projection displays, liquid crystal displays (LCD), digital light processing (DLP) displays, cathode ray tube (CRT) displays, and the like and have become capable of providing consumers with ever-increasing options regarding programming, display settings, menu options, and the like. For example, some such advanced television units include the ability to receive portable storage media, e.g. SD, xD, Compact Flash, Memory Stick, or other flash-based memory, including USB or IEEE1394 drives, so as to display captured video, photographs, or the like. Split-screen or picture-in-picture, where two channels are able to be viewed at once, has also become common in the television units currently sold. Cable and satellite companies have taken advantage of this technology by offering greater numbers of programming choices than ever before, including high-definition television broadcasts.

The cable and satellite companies also offer guides to their respective programming, typically in the form of a scroll-down interface displaying the time, channel, and title of a program. Advanced features allow for a brief description of a program upon selection of the program by the consumer from the guide. These guides do not, however, provide a visual display of the program. To view the program, even momentarily, the user is required to select the channel, thereby leaving the guide or menu. Some current televisions allow for the labeling of channels and organizing of channels by the consumer. In such a case, the channel being edited may be tuned to for viewing. However, such a display of both a currently running program and label is not available for browsing or channel selection, but is rather only displayed for editing.

DVD menus often include a chapter or scene selection sub-menu that organizes chapters or scenes in a two-dimensional layout. Video game consoles may also offer screenshot selection based upon a two-dimensional layout. However, in these types of user interfaces, the data displayed is often static and does not require processing to extract and aggregate information such as user defined labels, station names, program titles, and the like.

SUMMARY OF THE INVENTION

In accordance with one embodiment of the subject application, there is provided a system and method for displaying channel information and visual content in a two-dimensional array.

Further in accordance with one embodiment of the subject application, there is provided a system and method for non-linear channel selection using a two-dimensional array.

Still further in accordance with one embodiment of the subject application, there is provided a system and method for automatically parsing and aggregating VCT and user label information for use in a two-dimensional channel selection array.

Still further in accordance with one embodiment of the subject application, there is provided a system and method for using a two-dimensional interface with a combined intuitive navigation paradigm to improve channel browsing and selection.

Further in accordance with one embodiment of the subject application, there is provided a system for displaying and navigating a graphical two-dimensional array of a plurality of available channels on an associated display unit. The system includes means adapted for generating a two-dimensional array of a plurality of channel boxes on an associated display and means adapted for receiving a plurality of input signals corresponding to a respective plurality of available channels. The system further comprises parsing means adapted for parsing at least one input signal so as to acquire channel identification data indicative of at least one channel associated therewith. The system also comprises capture means adapted for capturing image data associated with the at least one channel in accordance with the acquired channel identification data and means adapted for populating at least one channel box with the acquired identification data and the captured image data.

In one embodiment of the subject application, the system further includes retrieving means adapted for retrieving pre-rendered logo indicia corresponding to at least one channel and generating means adapted for generating the retrieved pre-rendered logo indicia in the channel box corresponding to the at least one channel.

In another embodiment of the subject application, the system also includes means adapted for generating indicia in the array corresponding to a channel box associated with a current channel. In such an embodiment, the system further comprises means adapted for receiving user selection data corresponding to a selected channel box and transfer means adapted for transferring the generated indicia from the current channel box to the selected channel box.

In yet another embodiment of the subject application, the system also comprises means adapted for receiving user selection data corresponding to a channel selected from among the plurality of available channels and means adapted for receiving user label data representative of a label corresponding to the selected channel. The system also includes association means adapted for associating the received user label data with the identification data associated with the selected channel. In addition, the system includes storage means adapted for storing the association of user label data and channel identification data in associated memory and means adapted for generating the user label data in the channel box associated with the selected channel in the array of channel boxes on the associated display.

Further, in accordance with one embodiment of the subject application, the system also comprises means adapted for receiving page change data representative of a user input page change and means adapted for altering the display of the array of the plurality of channel boxes in accordance with the received page change data.

Still further in accordance with one embodiment of the subject application, there is provided a method for displaying and navigating a graphical two-dimensional array of a plurality of available channels on an associated display unit in accordance with the system as set forth above.

Still other advantages, aspects, and features of the subject application will become readily apparent to those skilled in the art from the following description, drawings, and Appendix, wherein there is shown and described a preferred embodiment of the subject application, simply by way of illustration of one of the modes best suited to carry out the subject application. As it will be realized, the subject application is capable of other different embodiments, and its several details are capable of modifications in various obvious aspects, all without departing from the scope of the subject application. Accordingly, the drawings and descriptions will be regarded as illustrative in nature and not as restrictive.

BRIEF DESCRIPTION OF THE DRAWINGS

The subject application is described with reference to certain figures, as well as an Appendix, the entirety of which is incorporated herein, including.

DETAILED DESCRIPTION OF THE PREFERRED EMBODIMENT

The subject application is directed to a system and method for displaying channel information and visual content in a two-dimensional array. In particular, the subject application is directed to a system and method for using a two-dimensional interface with a combined intuitive navigation paradigm to improve channel browsing and selection. More particularly, the subject application is directed to a system and method for displaying and navigating a graphical two-dimensional array of a plurality of available channels on an associated display unit. It will become apparent to those skilled in the art that the system and method described herein are suitably adapted to a plurality of varying electronic fields employing adaptive user interfaces including, for example and without limitation, communications, entertainment, general computing, data processing, document processing, or the like. The preferred embodiment, as depicted in FIG. 1, illustrates a document processing field for example purposes only and is not a limitation of the subject application solely to such a field.

Figure 1:
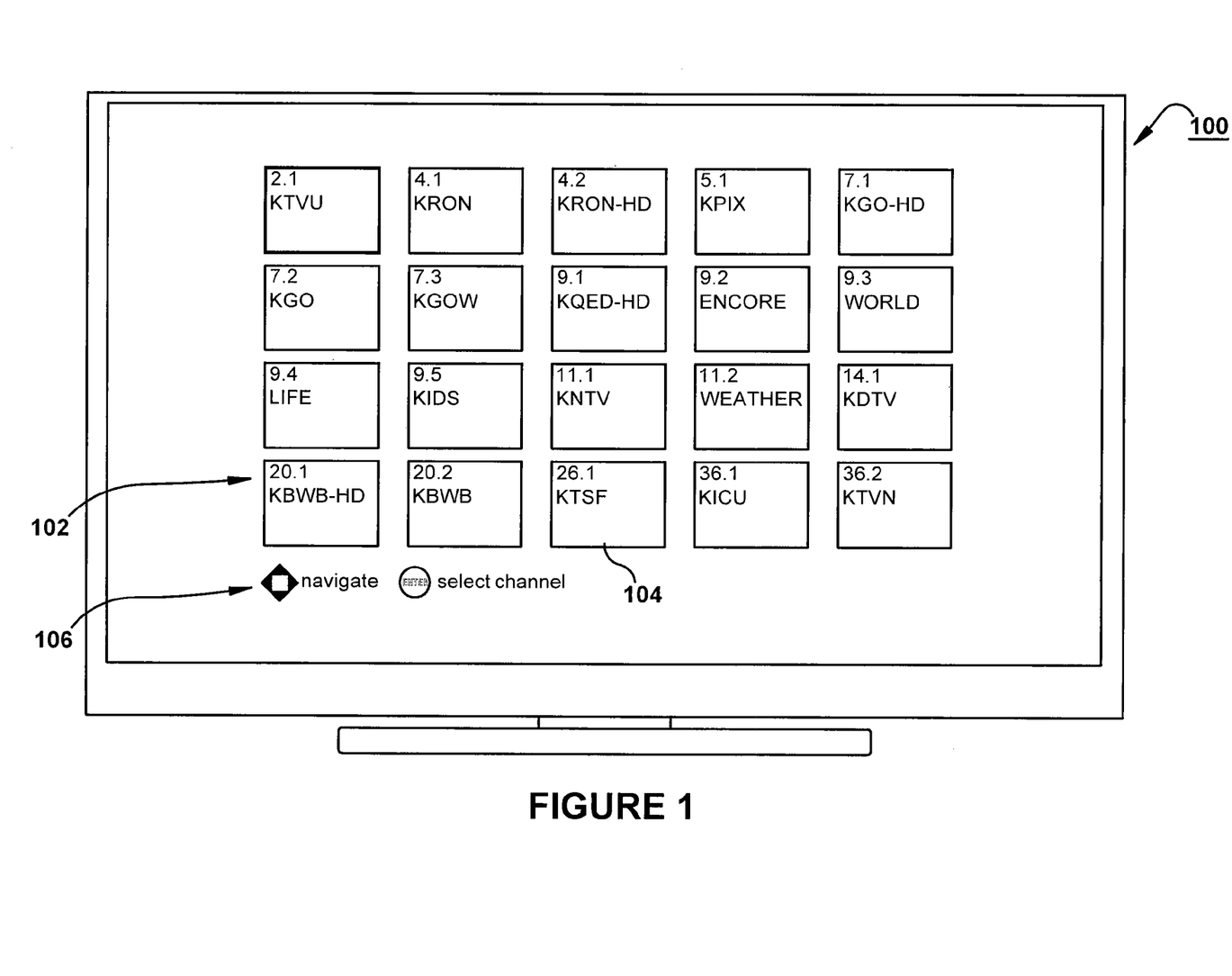
FIG. 1 is an illustration of a template full-screen for use in the system for displaying and navigating a graphical two-dimensional array of a plurality of available channels on an associated display unit according to one embodiment of the subject application.

Referring now to FIG. 1, there is shown an illustration of a display unit 100 for use in the system for displaying and navigating a graphical two-dimensional array of a plurality of available channels on an associated display unit in accordance with one embodiment of the subject application. As shown in FIG. 1, the display unit 100 is representative of any suitable device known in the art that is capable of displaying audiovisual signals to an associated user. It will be appreciated by those skilled in the art that such display units include, for example and without limitation, a CRT display unit, a Plasma display unit, an LCD display unit, a DLP display unit, or the like. In accordance with one embodiment of the subject application, the display unit 100 includes suitable hardware, software, or a combination thereof to facilitate the receipt and decoding of incoming data streams, e.g. a television signal, antennae inputs, playback signals, or the like. Preferably, the display unit 100 includes memory (not shown), a microprocessor (not shown), and control logic to facilitate the decoding and display of such received data streams. It will be understood by those skilled in the art that any suitable display unit 100 is capable of implementing the system and method for displaying and navigating a graphical two-dimensional array of a plurality of available channels on an associated display unit of the subject application.

In accordance with one embodiment of the subject application, the display unit 100 further includes a myriad of inputs and/or outputs to facilitate the receipt and/or transmission of data streams. Suitable connections include, for example and without limitation, DVI, HDMI, RCA, Coaxial, Component, S-Video, and other such audiovisual connections, as will be known to one skilled in the art. According to a further embodiment of the subject application, the display unit further includes one or more interfaces to receive portable storage media including, for example and without limitation, SD, microSD, CompactFlash, Memory Stick, USB, Firewire, or other nonvolatile memory, as is known in the art.

As shown in FIG. 1, the display unit 100 includes a display 102, suitably adapted to display unit information, television channels, menu interfaces, and the like. In accordance with one embodiment of the subject application, the display 102 is suitably adapted to display high-definition television signals, e.g. 720i, 720P, 1080i, 1080p, or the like resolutions. The channel browsing component of the subject application enables the display 102 to depict a plurality of channels as discrete windows or boxes 104, as illustrated in FIG. 1. As shown, the windows 104 each display a separate incoming channel, labeled as such in accordance with user-specified labels, incoming VCT data, or the like. In accordance with one embodiment of the subject application, the windows 104 further display data representative of the type of signal displayed, e.g. high-definition, normal, cable, broadcast, satellite, digital, analog, or the like.

Figure 2:
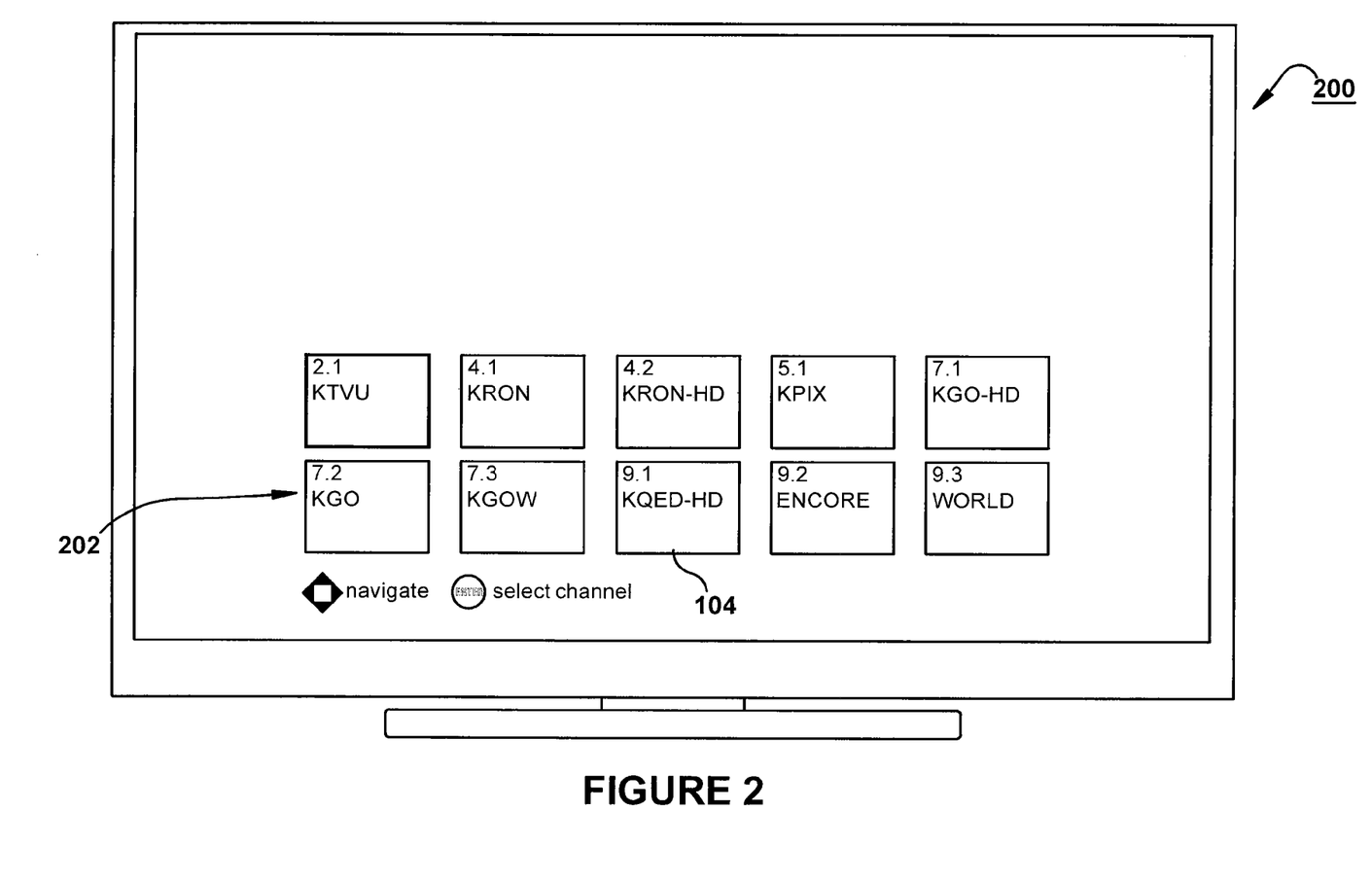
FIG. 2 is an illustration of a template half-screen for use in the system for displaying and navigating a graphical two-dimensional array of a plurality of available channels on an associated display unit according to one embodiment of the subject application.

In accordance with one embodiment of the subject application, the display 102 includes navigation help 106, such as context sensitive help, prompts, or the like, capable of being located at a desired location on the display 102. Such context sensitive help includes, for example and without limitation, an indication on the number of channel boxes 104 in subsequent pages and the like. As used in the instant application, the pages refer to the display of the two-dimensional array such that each page corresponds to a different array of channel boxes 104. The skilled artisan will appreciate that the channel browser of the subject application is illustrated in the display 102 corresponding to a two-dimensional array of channel blocks 104. For the full-screen display of FIG. 1, the array is shown as a 5×4 array; however, the skilled artisan will appreciate that such an array is for example purposes only, and other arrays, e.g. 8×4 or the like, are equally capable of being used in accordance with the channel browser of the subject application. The display unit 200 of FIG. 2 illustrates an optional half-screen channel browser display 202, as will be understood by those skilled in the art. The half-screen channel browser display 202 depicts a 5×2 array; however, other such arrays, e.g. 8×2, are equally capable of being used in accordance with the subject application.

In accordance with one example embodiment of the subject application, the half-screen channel browser display 202 enables the viewing of video background, i.e. a predetermined graphic or pre-selected channel is shown in the background and the foreground displays the two-dimensional array of channels. Further in accordance with one example embodiment of the subject application, the full-screen channel browser display 102 displays thumbnails of images, live video feed, or the like. The skilled artisan will appreciate that, in implementation of the channel browser of the subject application, the half-screen two-dimensional channel browser array 202 is capable of being displayed with a greater number of columns than that of the full-screen display 102.

The subject application is further capable of implementing affiliated station logos, e.g. pre-rendered graphics of station logos, in the windows 104 or 204. According to one embodiment of the subject application, the logo is displayed below any channel number and channel label information. Preferably, as thumbnails become available with respect to the full-screen display 102, the affiliated logo is replaced. In accordance with one example embodiment of the subject application, context is maintained during page scrolling. For example, the last channel box of the old page is repeated as the first channel box of the new page. In such an example embodiment, the page number and total number of pages are displayed on the display 102 and 202.

Each of the windows, or channel boxes 104 and 204, corresponds to one channel received by the display unit 100 and 200. As shown in FIGS. 1 and 2, each box 104 and 204 is displayed in a 4:3 aspect ratio, with left-justified texts. The skilled artisan will appreciate that other ratios and text implementations are capable of being used in accordance with the subject application. Continuing with the examples of FIGS. 1 and 2, the first row of text in the boxes 104 and 204 indicates the major and minor channel numbers, and the second row of text displays the channel label, e.g. user-specified, VCT-based call sign, station affiliation, or the like. Below the text rows, an applicable pre-rendered icon for an affiliated station is also displayed. As previously mentioned, when using full-screen browsing, the logo is displayed until a thumbnail or live feed for the corresponding channel is available.

Preferably, the capture area of each thumbnail of the corresponding channel matches the 4:3 aspect ratio of channel boxes 104 and 204. For example, when the incoming signal for a channel is analog or 480i/p digital, the full screen is captured for display as the thumbnail image in the channel box 104 or 204. When the incoming signal for a channel is 1080i or 720p digital, the center of the video is captured and displayed in the channel box 104 or 204. It will be understood by those skilled in the art that many of the incoming digital channels are normally in 4:3 content encoded with pillars on the left and right sides of the screen. The skilled artisan will appreciate that the use of the center of video for those channels broadcast in a format other than native 4:3 ratio results in maintaining the aspect ratio of the actual content, e.g. 16:9 or the like.

In accordance with the foregoing example embodiment of the subject application, the channel browser tunes and captures thumbnails in the background, such that capture is first performed for visible channel boxes 104 and 204, followed by the remainder of the channels, e.g. the channels on subsequent pages of the display 102 and 202. Once all the channels have a thumbnail captured, a new capture is performed to replace the oldest thumbnail for the visible channel boxes 104 and 204. It will be appreciated by those skilled in the art that due to the wide range of possible colors on different stations, thumbnail capture may only be possible if the graphics plane supports 24-bit or higher pixels. Preferably, scaling of images with respect to the thumbnail capture is not performed in accordance with the subject application. That is, pixels from the frame buffer are sampled at fixed locations. The skilled artisan will appreciate that such a preference may not apply to all hardware platforms implementing the subject application.

Additional embodiments of the subject application provide for an icon in the channel boxes 104 and 204 to indicate high-definition broadcasting of channels that are encoded in 1080i or 720p format. Preferably, the icon is generated asynchronously, similar to the generation of the thumbnails discussed above. According to a further embodiment of the subject application, frequently viewed channels or user-specified favorite channels are further distinguished in the display 102 and 104 of the channel browser. Suitable distinguishing methods include, for example and without limitation, highlight color, larger display, flashing, or the like. In such an embodiment, for example, the less frequently viewed channels are displayed in smaller boxes. The skilled artisan will appreciate that the determination of frequently viewed channels is capable of being based upon a combination of tuning frequency and viewing duration, such that record keeping and validation by the display unit 100 and 200, or suitable components thereof, must be performed. Further embodiments include overlaying favorite channels, highlighting of stored favorite channels, a designated remote key to skip to the next stored favorite channel, and the like. In addition, the subject application enables the selection of an input source from the channel browser display 102 and 202, as will be appreciated by those skilled in the art. It will be understood by those skilled in the art that the input source includes, for example and without limitation, an input/data feed, such as a signal from an antenna, user defined label data, data from VCT/PSIP, or the like.

Figure 3:
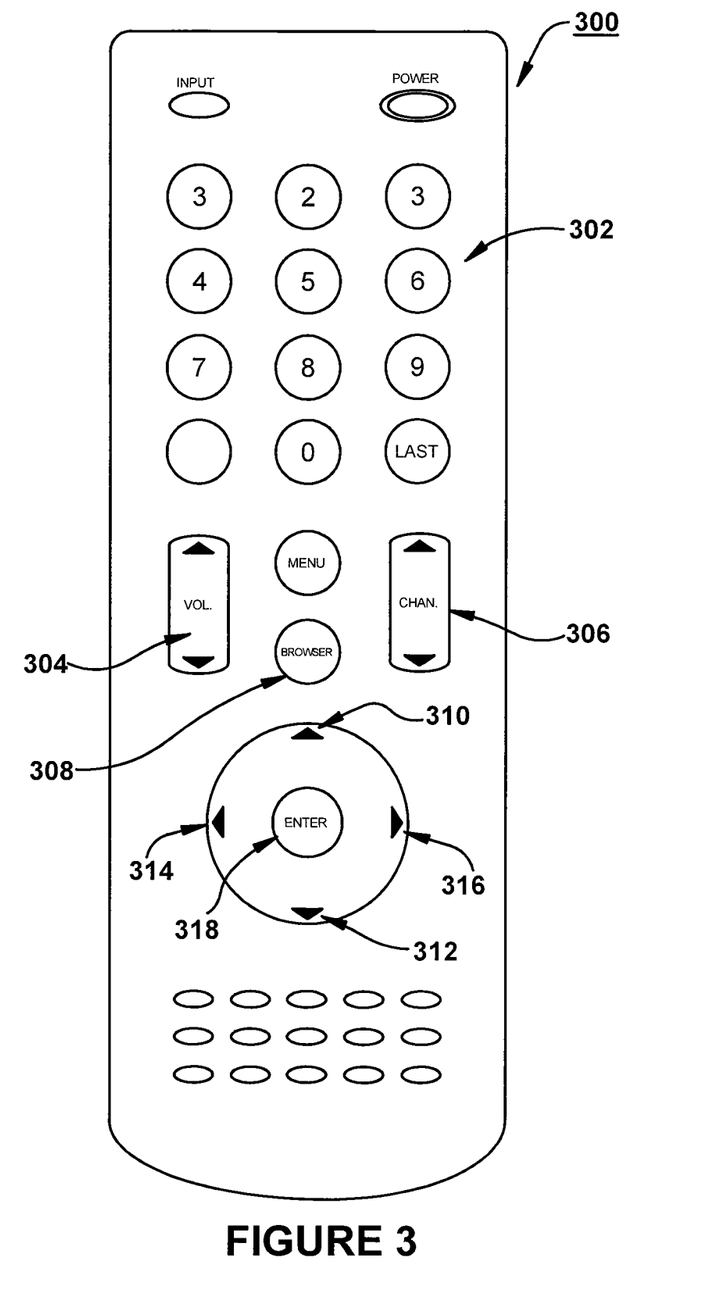
FIG. 3 is an illustration of remote for use in the system for displaying and navigating a graphical two-dimensional array of a plurality of available channels on an associated display unit according to one embodiment of the subject application.

Turning now to FIG. 3, there is shown an illustration representing a sample remote 300 for use with the display unit 100, 200 in the system for displaying and navigating a graphical two-dimensional array of a plurality of available channels on an associated display unit in accordance with one embodiment of the subject application. It will be understood by those skilled in the art that the remote 300 displayed in FIG. 3 is for example purposes only, and other configurations of a suitable remote associated with a corresponding display unit are capable of being implemented in accordance with the subject application. As shown in FIG. 3, the remote 300 includes a plurality of numeric input keys 302, the selection of which generates a communication signal to the associated display unit 100 or 200. The skilled artisan will appreciate that any suitable type of communication carrier known in the art is capable of being used for to communicate the signal from the remote 300 to the display unit 100 or 200 including, for example and without limitation, RF, IR, optical, wireless or wired links, or the like. The remote 300 further includes a volume control key 304, which either raises or lowers the volume output by the display unit 100 or 200, as will be appreciated in the art. The channel control key 306 suitable facilitates the movement of the tuning of the display unit 100 or 200 such that the displayed channel increases in channel number or decreases in channel number, depending upon the user pressure on the key 306.

A browser key 308 is shown on the remote 300 for illustration purposes only and facilitates the launching of the browser display 102 or 202 on the respective display unit 100 or 200. The remote 300 further includes four arrow keys, an up arrow key 310, a down arrow key 312, a left arrow key 314, and a right arrow key 316. An enter key 318 is included on the remote 300 to facilitate the confirmation of user input data, e.g. a key press from the remote 300, as will be understood by those skilled in the art. In accordance with one embodiment of the subject application, the arrow keys 310-316 facilitate the movement of selection of a channel box 104 or 204 on the associated display 102 or 202, as is discussed herein. Preferably, the movement of the arrow keys 310-316 changes the selection of a desired box 104 or 204 on the display 102 or 204 using a suitable indicator to indicate to the user the current box 104 or 204. Suitable indicators include, for example and without limitation, highlighting the selected box 104 or 204, flashing the selected box 104 or 204, or other such indicators, as will be understood to one skilled in the art.

In operation, a two-dimensional array of channel boxes is first generated on an associated display. Input signals are then received corresponding to a respective plurality of available channels. At least one of the received input signals is then parsed to acquire channel identification data indicating at least one channel associated with the parsed signal. Image data associated with the indicated channel is then captured. Thereafter, at least one channel box is populated in the array with the acquired identification data and the captured image data.

According to one example embodiment of the subject application, a two-dimensional array 102 of channel boxes 104 is first generated on a display unit 100. Preferably, the two-dimensional array 102 consists of a predetermined number of 4:3 aspect ratio windows, each window to be assigned a channel from among a plurality of channels. Input signals are then received by the display unit 100, e.g. from a cable converter, satellite converter, antenna, coaxial cable, or the like. As will be understood by those skilled in the art, the input signals correspond to a plurality of available channels for viewing via the display unit 100.

The display unit 100, via suitable hardware, software, or a combination thereof, parses one of the input signals to acquire channel identification data corresponding to the channel associated with the input signal. The channel identification data includes, for example and without limitation, channel number, VCT information, PSIP information, and the like. If a pre-defined user label is available, based upon the channel identification data, the label is retrieved from memory associated with the display unit 100 and generated in the channel box 104 associated with the channel in the channel browser array 102. When the channel represents a station affiliated with a major network, e.g. CBS, ABC, NBC, FOX, TBS, TNT, ESPN, or the like, a pre-rendered logo graphic is retrieved from memory and displayed in the corresponding channel box 104. It will be appreciated by those skilled in the art that the display of the logo in the associated channel box 104 only occurs when a station is affiliated with a major network, the pre-rendered logo is available, and no image data is currently available. That is, as image data is captured, the logo is replaced with the captured image.

Image data is then captured from the input signal for inclusion in the corresponding channel box 104. The channel box 104 in the array 102 is then populated with the channel identification data, including any user-specified labeling, and the captured image data. It will be appreciated by those skilled in the art that the process of populating the array 102 is capable of being performed by first populating each channel box 104 with channel identification data, logo graphic if available, and user-specified label first. Once each box 104 includes a display of such data, images are captured and displayed in the background of the channel box 104, replacing the logo if displayed therein. The current channel, which is preferably displayed on the current page of the channel browser array 102, is then indicated via suitable indicia distinguishing the current channel box 104 from the other channel boxes 104 in the array 102, e.g. highlighted, outlined, flashing, or the like. This process is repeated until no more channels remain to be input into the two-dimensional channel browser array 102.

Once all boxes 104 have been generated, the channel browser array 102 waits for the input of a key signal from the remote 300. Preferably, the channel browser array 102 continues to capture image data from each channel and re-generate the associated channel box 104 so as to provide the user with a current image of the channel associated with each box 104.

After receiving a key input from a user via the remote 300, the display unit first determines the type of key input. When the key input received from the remote 300 does not correspond to a browser related key, e.g. a menu key, number key, input key, etc., the display unit 100 performs the function associated with the key input, exiting the channel browser array 102. When the key input does correspond to a browser function, for example, when the key input corresponds to a page up or page down command, i.e. the receipt of page selection data, the array 102 is altered in response to the received page selection data. Preferably, a page describes all the channel boxes 104 displayed on the display unit 100 at a time, such that changing the page up or down results in altering the array 102 to include channels either numerically preceding the current page or succeeding the current page.

When the type of key input does not correspond to a page change, channel selection data is received from the remote 300, e.g. the user has depressed one of the arrow keys 310-316 to move the current channel to a new channel. Preferably, the indicia generated on the previously current channel box 104 is transferred to the new channel box 104 in accordance with the arrow key 310-316 depressed by the user. Once the desired channel has been selected by the user, the user is provided with the opportunity to specify a custom label for the channel associated with the selected channel box 104. The user is able to tune directly to the channel indicated by the currently selected channel box 104 by selecting the enter key 318, whereupon the display unit 100 tunes to a full-screen display of the channel associated with the selected channel box 104.

In the event that the user desires to add a custom label to the channel associated with the currently selected channel box 104, the user is prompted via a suitable graphical user interface to select alphanumeric characters to describe the channel using the remote 300. The received label data is then associated with the channel corresponding to the selected channel box 104 and stored in memory associated with the display unit 100. Thereafter, the channel box 104 is re-rendered using the identification data along with the custom label data. Preferably, when a custom label is available for a given channel, the identification data received in the input signal is altered such that the VCT data or PSIP data is replaced with the custom label. Operations then return to the browser array 102 awaiting user key input from the remote 300. It will be appreciated by those skilled in the art that the user is able to exit the channel browser array 102 at any time during the display thereof by selecting a suitable exit key (not shown) or browser key 308 on the remote 300, whereupon operations of the display unit 100 return to displaying a single channel.

Figure 4:
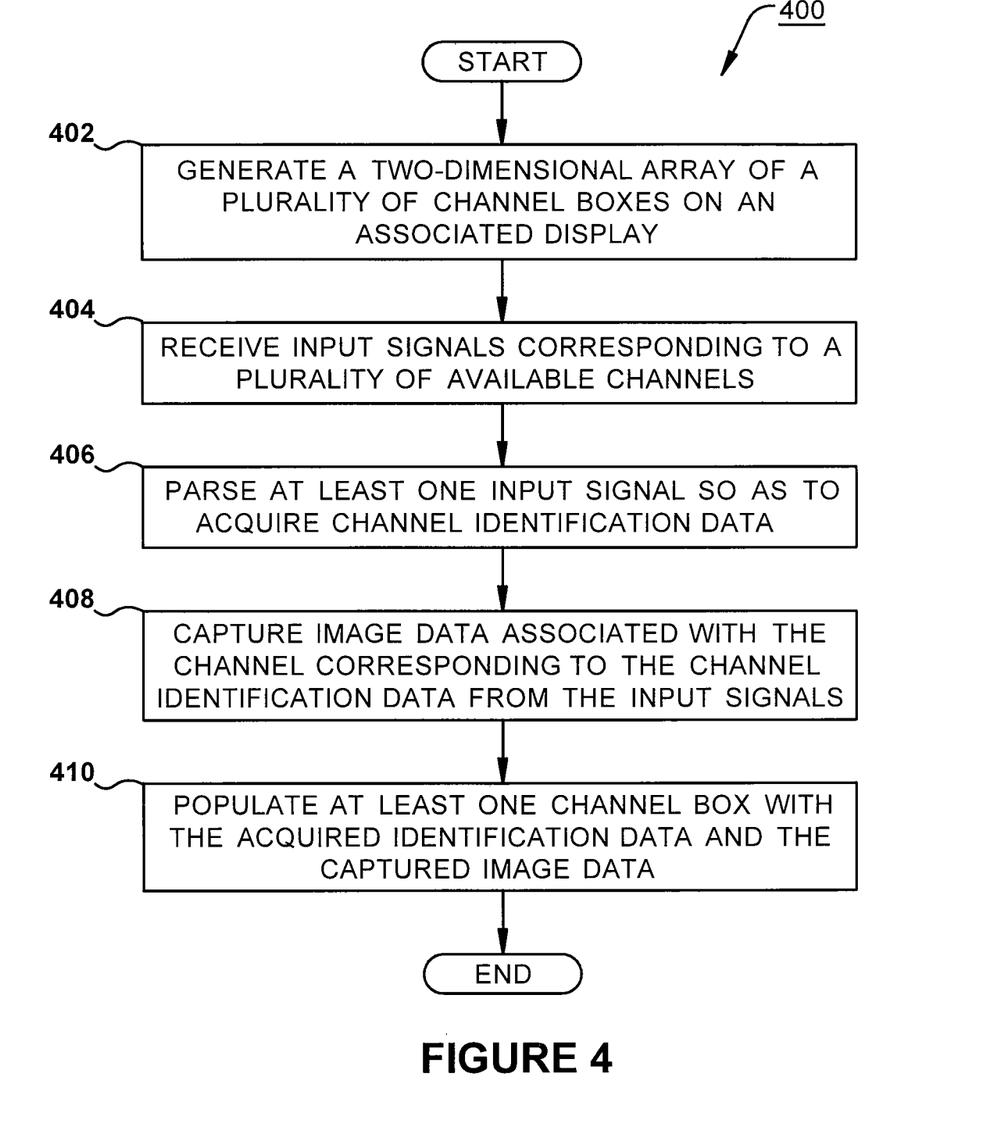
FIG. 4 is a flowchart illustrating a method for displaying and navigating a graphical two-dimensional array of a plurality of available channels on an associated display unit according to one example embodiment of the subject application.

The skilled artisan will appreciate that the subject system 100 and components described above with respect to FIG. 1, FIG. 2, and FIG. 3 will be better understood in conjunction with the methodologies described hereinafter with respect to FIG. 4, FIG. 5A, FIG. 5B, FIG. 6A, FIG. 6B, and FIG. 6C. Turning now to FIG. 4, there is shown a flowchart 400 illustrating a method for displaying and navigating a graphical two-dimensional array of a plurality of available channels on an associated display unit in accordance with one example embodiment of the subject application. For example purposes only, reference is made hereinafter to the full-screen channel browser display 102 of the display unit 100 illustrated in FIG. 1. Beginning at step 402, the display unit 100 generates a two-dimensional array 102 of channel boxes 104. As set forth in greater detail above, the layout and the size of the channel boxes 104 are predetermined in accordance with the display characteristics of the display unit 100, user-specified preferences, manufacturer-specified preferences, or the like.

The display unit 100 then receives, at step 404, a plurality of input signals corresponding to a plurality of available channels. It will be appreciated by those skilled in the art that the received input signals include, for example and without limitation, broadcast television signals, satellite television signals, cable television signals, and the like. At least one of the received input signals is then parsed, or analyzed, at step 406, so as to acquire channel identification data identifying a channel contained in the input signal and other identifying information associated therewith. The skilled artisan will appreciate that suitable identification information includes, for example and without limitation, station identification, VCT data, PSIP data, station affiliation, channel number, and the like. At step 408, image data associated with the channel, as determined from the channel identification data, is then captured by the display unit 100 or a suitable hardware or software component thereof. In accordance with one embodiment of the subject application, the image data corresponds to a thumbnail of a television program currently being broadcast on the channel.

At least one of the channel boxes on the display 102 is then populated with the acquired identification data and the image data at step 410, resulting in a two-dimensional channel browser array on the display 102. It will be understood by those skilled in the art that such parsing and image acquisition is performed for each of the available channels until all channels available from the received input signals have been populated to the array 102. According to a further embodiment of the subject application, the method described above with respect to FIG. 4 repeats until such time as an associated user selects a channel for viewing or exits the browser, as will be understood by one skilled in the art.

Figure 5A:
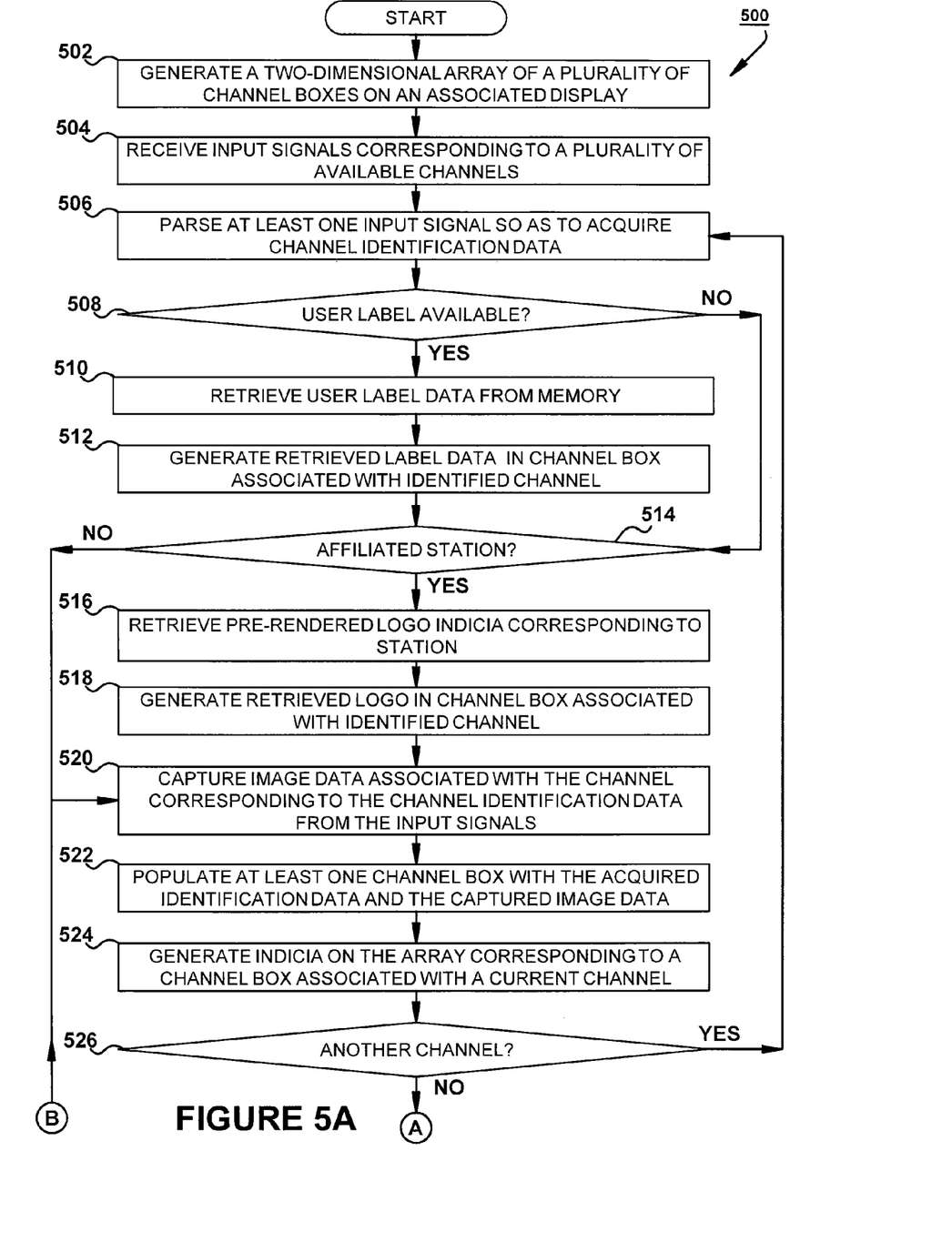
FIGS. 5A and 5B are a flowchart illustrating a method for displaying and navigating a graphical two-dimensional array of a plurality of available channels on an associated display unit according to one example embodiment of the subject application.
Figure 5B:
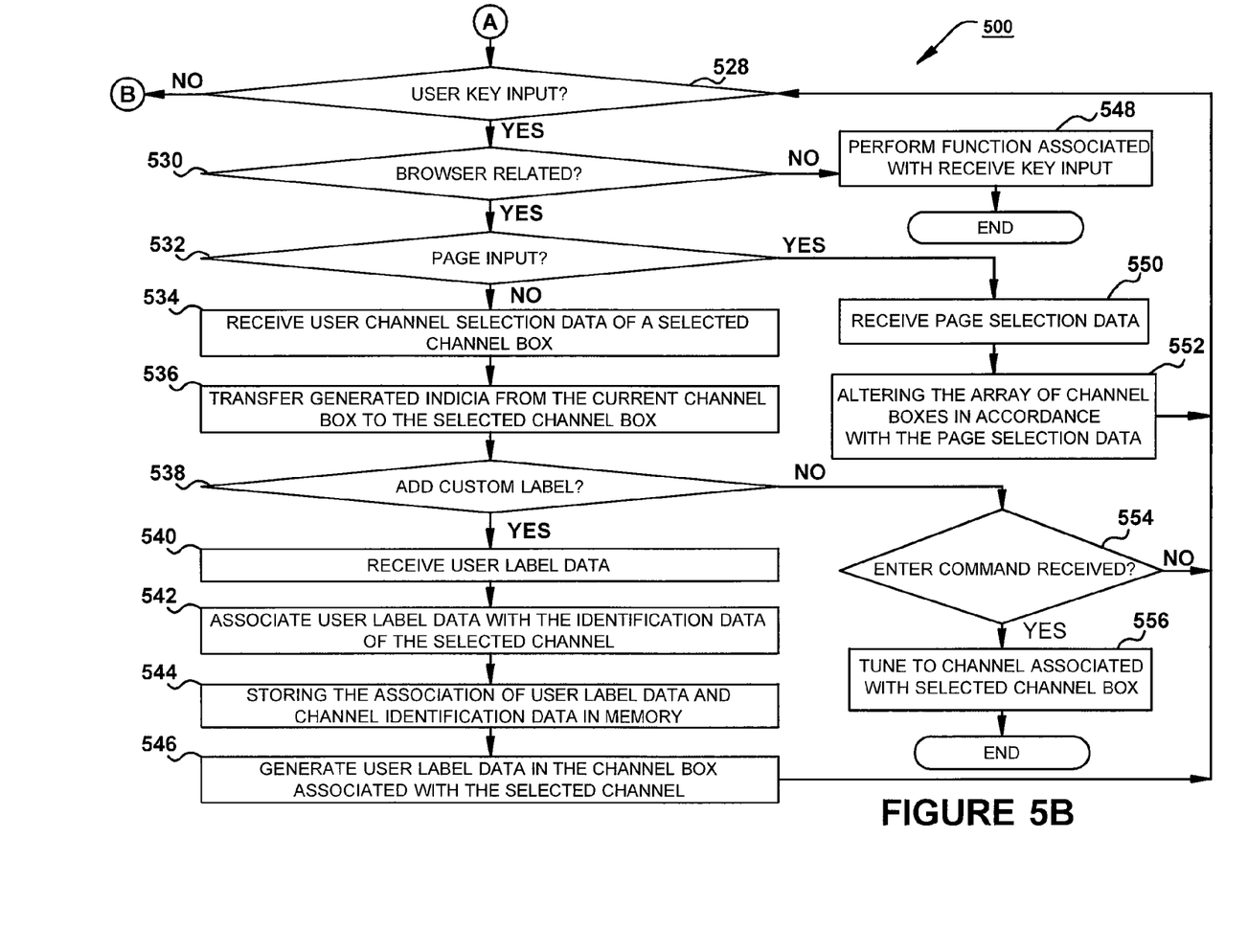

Referring now to FIGS. 5A and 5B, there is shown a flowchart 500 illustrating a method for displaying and navigating a graphical two-dimensional array of a plurality of available channels on an associated display unit in accordance with one example embodiment of the subject application. The method depicted in FIGS. 5A and 5B begins at step 502, whereupon a two-dimensional array 102 of a plurality of channel boxes 104 is generated on a display associated with the display unit 102. Preferably, the channel boxes 104 represent a 4:3 aspect ratio, as will be understood by those skilled in the art. In accordance with one embodiment of the subject application, the generation of the two-dimensional display 102 includes, first, the initialization of the location of the channel boxes 104 and, second, the mapping of a channel to a channel box 104, rendering information regarding the channel at the location specified by the channel box 104, and repeating this process until all channels visible on a page have been rendered. It will be appreciated by those skilled in the art that, in such an embodiment, the initialization is preferably done upon activation of the display unit 100 should dynamic configuration not be necessary. The second component of the generation preferably occurs upon every occurrence of a change in the display 102, e.g. when the cursor changes position as a result of remote arrow key 310-318 press, when showing/hiding channel browser on screen, and when going to previous or next logical page, as is discussed in greater detail below.

The display unit 102 then receives, at step 504, a plurality of input signals corresponding to a plurality of available channels. In accordance with one example embodiment of the subject application, the input signals represent a plurality of television signals received from a cable converter, satellite converter, antenna, tuner, or the like, as will be understood by one skilled in the art.

At least one signal is then parsed at step 506 from the received input signals so as to acquire channel identification data associated with the channel corresponding to the signal, such as, for example and without limitation VCT information, PSIP information, station affiliation information, resolution information, and the like. A determination is then made at step 508 whether a user-specified label is available for the identified channel. That is, whether a previously specified alphanumeric label resident in memory associated with the display unit 102 is available for use. When no user-specified label is available, flow proceeds to step 514, discussed in greater detail below. When a label is available, flow proceeds to step 510, whereupon user-specified label data is retrieved from associated memory. The retrieved label data is then generated in the channel box 104 associated with the channel identification data at step 512.

Operations then proceed to step 514, whereupon a determination is made as to whether the station broadcasting the identified channel is an affiliated station; that is, whether or not the station from which the channel originates is affiliated with a recognized television network, e.g. ABC, CBS, NBC, FOX, CNN, ESPN, or the like. Preferably, the determination of whether a station is affiliated is based upon the identification data parsed from the input signal, as will be understood by one skilled in the art. When the station is not affiliated with any recognized network, e.g. a network that does not have a pre-rendered logo graphic associated therewith, flow proceeds to step 520 for image capture as discussed below. Upon a determination at step 514 that the station is affiliated with a known network, flow progresses to step 516, whereupon pre-rendered logo indicia is retrieved from associated memory. For example, when the station is an NBC affiliated station, a suitable pre-rendered "peacock" logo is retrieved from memory. The retrieved logo indicia are then generated in the channel box 104 associated with the identified channel at step 518.

Image data corresponding to a broadcast of the identified channel is then captured at step 520. In accordance with one example embodiment of the subject application, the image data corresponds to a capture of a thumbnail image of a program currently included in the input signal, e.g. a frame capture of the broadcast. According to one embodiment of the subject application, the resolution of the broadcast is taken into account, e.g. standard, high-definition, etc., such that the image captured corresponds to a full screen image for those standard broadcasts and a center portion of the screen for a high-definition broadcast. At step 522, the channel box 104 associated with the channel identification data is then populated with the captured image data and the channel identification data. Indicia are then generated on the array 102 indicating the current channel selected at step 524. In accordance with one embodiment of the subject application, the channel identification data is displayed in the foreground, e.g. station name, user-specified label, channel number, or the like, and the captured image data is displayed in the background, e.g. a thumbnail image overlayed by the identification data.

A determination is then made at step 526 as to whether another channel remains to be identified from the input signals; that is, a determination is made as to whether one or more channels remain to be analyzed so as to populate the channel browser array 102. When one or more channels remain in the input signals, flow returns to step 506, whereupon the next input signal is parsed as set forth above. When no further channels remain for initial processing, flow proceeds to step 528, whereupon a determination is made as to whether a user input key has been received, i.e. whether or not the user has depressed a key on the remote 300. When no user input has been detected, operations return to step 520, whereupon the thumbnails associated with each channel box 104 are refreshed through image capture on the underlying channel so as to present the user with updated views of the channels.

A determination is then made at step 530 as to whether the received input key corresponds to a browser-based function, e.g. page selection, channel box selection, user-label specification, or the like. When the received key does not reflect a browser function, operations proceed to step 548, whereupon the function associated with the received key input is performed by the display unit 100.

When a user key has been input at step 528 that corresponds to a browser-based function, a determination is made at step 532 as to whether the input key corresponds to a page selection key. Upon a positive determination at step 532, flow proceeds to step 550, whereupon page selection data is received from the user via the remote 300. The channel browser array 102 is then altered in accordance with the page selection data at step 552. In accordance with one embodiment of the subject application, when page down selection data has been received, the lower-right most channel box 104 is then shown as the upper-left most channel box 104 on the new page display of the array 102. When the page up selection data has been received, the upper-left most channel box 104 is displayed as the lower-right most channel box 104 on the new page so as to maintain continuity for the user. Once the new page is displayed on the display unit 100, flow returns to step 528 to await further user key input or to return to image capturing at step 520.

Upon a determination at step 532 that the received input key is not a page selection key, operations progress to step 534, whereupon user channel selection data representative of a selected channel box 104 is received by the display unit 102. At step 536, the generated indicia indicating the current channel are transferred to the box 104 selected by the user. A determination is then made as to whether the user has selected to add a custom label at step 536. In accordance with one example embodiment of the subject application, a popup window is displayed to the user upon movement to the new box 104, prompting the user to add a specific label. According to a further embodiment of the subject application, the user is capable of adding a specific channel label via the input of a dedicated key on the remote 300. Upon a negative determination at step 538, flow proceeds to step 554, whereupon a determination is made whether the user has depressed the enter key 318 of the remote 300. When the enter key 318 is received, the display unit 100 tunes to the channel associated with the selected channel box 104 at step 556 and the channel browser array 102 exits. Upon a negative determination at step 538 and another negative determination at step 554, operations return to step 528 to await the receipt of another user key input.

Returning to step 538, when it is determined that the user desires to add a custom label to the selected channel, flow proceeds to step 540. At step 540, user label data is received by the display unit 100 via user interaction in accordance with inputs received from the remote 300. According to one embodiment of the subject application, a popup keyboard is displayed upon a determination that a custom label is to be added, enabling the user to select one or more alphanumeric characters using the arrow keys 310-316 of the remote 300 to specify the custom label. At step 542, the received label data is associated with the identification data corresponding to the selected channel box 104. The association of the label data with the channel of the selected channel box 104 is then stored in memory associated with the display unit 100 at step 544. At step 546, the user label data is generated in the associated channel box 104 in the channel browser array 102. Operations then return to step 528 to await further key inputs from the remote 300.

Figure 6A:
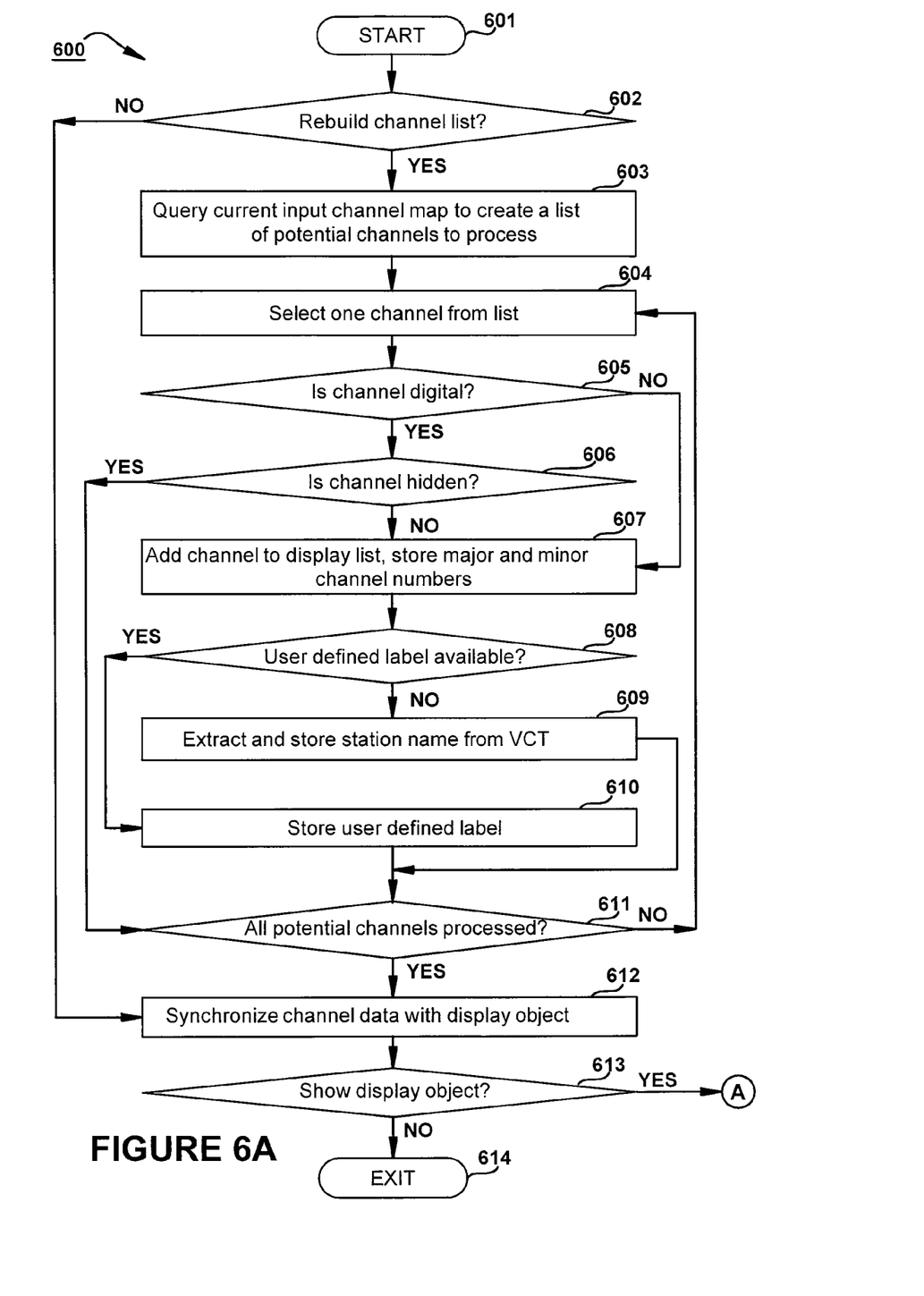
FIGS. 6A, 6B, and 6C are a flowchart illustrating a method for displaying and navigating a graphical two-dimensional array of a plurality of available channels on an associated display unit according to one example embodiment of the subject application.
Figure 6B:
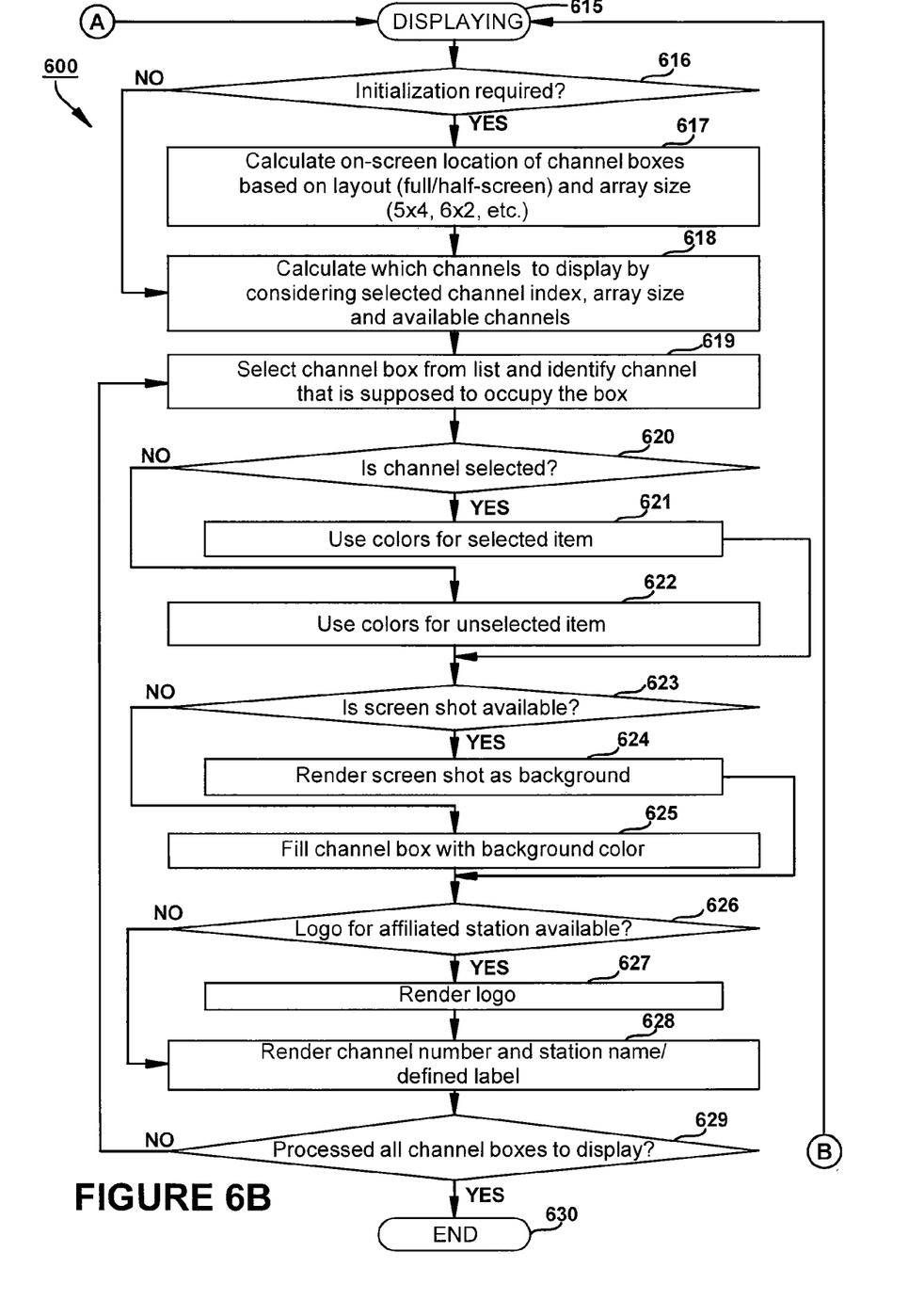
Figure 6C:
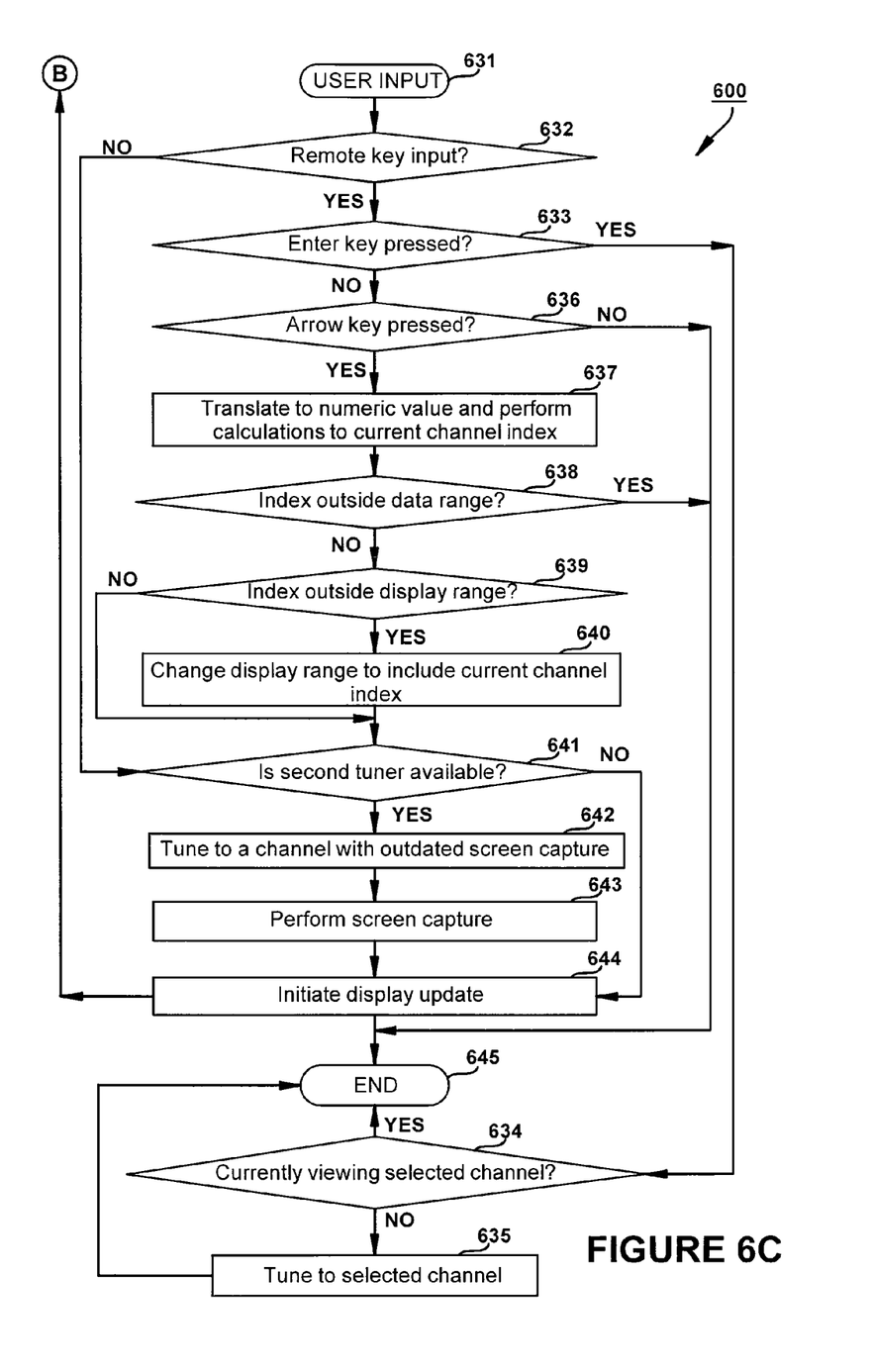

Turning now to FIGS. 6A, 6B, and 6C, there is shown a flowchart 600 illustrating a method for displaying and navigating a graphical two-dimensional array of a plurality of available channels on an associated display unit in accordance with one example embodiment of the subject application. As depicted in FIGS. 6A, 6B, and 6C, steps 601 through 614 are associated with the enabling of the channel browser display 102 or 202, collecting and processing data, making such data available for later use, and disabling the channel browser display 102 or 202. Steps 615 through 630 are associated with determining the presentation, e.g. full or half-screen, location, number of channel boxes 104 or 204 in the array 102 or 202, mapping channels to the channel boxes for display, and rendering channel boxes to display information, e.g. channel numbers, station name, station label, selection highlight, logos, background, and the like. Steps 631 through 645 are associated with filtering unwanted remote key presses, translating supported key presses into changes on the display visible to the user, and performing channel changes, thereby exiting the channel browser.

At step 601, the channel browser 102 or 202 of the subject application is initiated and a determination is made at step 602 as to whether to rebuild the channel list, e.g. a list of available channels. When a rebuild is not necessary, operations proceed directly to step 612, discussed below. When a channel rebuild is necessary, the current input channel map is queried to create a list of potential channels to process at step 603. A channel is then selected at step 604 from the list and a determination is made at step 605 as to whether the channel is a digital channel. When the channel is determined to be a digital channel, a determination is made at step 606 as to whether the channel is hidden. If hidden, flow proceeds to step 611, whereupon a determination is made whether all channels in the list of channels have been processed. A positive determination at step 611 prompts the synchronization of channel data with display object at step 612.

Returning to step 605, when the channel is determined not to be a digital channel, or when the channel is not hidden, flow proceeds to step 607. At step 607, the channel is added to the display list, and the major and minor channel numbers are stored in association therewith. A determination is then made at step 608 as to whether user-defined label data is available; that is, a determination is made as to whether or not an associated user has previously supplied label data associated with the current channel being processed. When no previous user-defined label is available, flow proceeds to step 609, whereupon the station name is extracted from the VCT and stored. If a user defined label is available at step 608, flow proceeds to step 610, whereupon the label is stored in associated with the channel being processed. Thereafter, operations proceed to step 611, whereupon a determination is made as to whether all channels in the channel list have been processed.

When all channels have been processed, as determined at step 611, flow proceeds to step 612, whereupon channel data is synchronized with a display object, as will be understood by one skilled in the art. A determination is then made at step 613 as to whether the display object is to be shown. Upon a negative determination at step 613, operations of FIGS. 6A, 6B, and 6C are terminated at step 614. When the display object is to be shown, as determined at step 613, flow proceeds to the displaying portion of FIGS. 6A, 6B, and 6C at step 615.

A determination is first made at step 616 as to whether initialization is required, e.g. whether or not the channel browser 102 or 202 has been previously displayed on the display unit 100. When initialization is not required, operations proceed to step 618, discussed below. In the event that initialization is required, at step 617 the on-screen location of channel boxes 104 or 204 is calculated based on the selected layout (full screen 102 or half screen 202) and the corresponding array size (5×4, 6×2, etc.). At step 618, the channels to be displayed are calculated by considering a selected channel index, array size, and the available channels. A channel box 104 or 204 is then selected at step 619 from the list, and the channel that is to occupy the selected box 104 or 204 is identified. A determination is then made at step 620 as to whether the channel has been selected, e.g. the current channel, selected via key inputs of the user, or the like. If the channel has been selected, the color scheme for a selected channel is implemented in the display 102 or 202 at step 621. If the channel has not been selected, a different color scheme associated with non-selected channels is used for the channel shown in the associated display 102 or 202.

A determination is then made at step 623 as to whether a screen capture is available for incorporation in the current channel box 104 or 204. If available, the screen capture is rendered as a background for the current channel box 104 or 204 at step 624. If the screen capture is not available, the channel box 104 or 204 is filled with the corresponding color as a background image at step 625, e.g. the color associated with the corresponding color scheme. A determination is then made at step 626 as to whether station logo data is available corresponding to the current channel. If available, the corresponding logo is rendered in the current channel box 104 or 204 at step 627, and flow proceeds to step 628. Following the rendering of the logo, or when such a logo is unavailable, the channel number and station name or defined label are rendered in the current channel box 104 or 204 at step 628. A determination is then made at step 629 as to whether all channel boxes 104 or 204 in the channel browser display 102 or 202 have been processed. When complete, the operations terminate at step 630, with the channel browser display 102 or 202 remaining on the display unit 100 or 200, thereby awaiting user input at step 631. When incomplete, operations return to step 619, as set forth above.

A determination is first made at step 632 as to whether an input key 302-318 associated with the remote 300 has been selected, e.g. pressed, by an associated user. In the event that no user inputs, e.g. user selection of an input key 302-318, have been detected, operations proceed to step 641, whereupon a determination is made as to whether a secondary tuner is available. It will be appreciated by those skilled in the art that the presence of a secondary tuner is dependent upon the display unit 100 or 200 in which the channel browser display 102 or 202 is implemented. If a secondary tuner is not available, a display update is initiated at step 644, whereupon operations return to step 615 in accordance with the methodology discussed in greater detail above. When a secondary tuner is available, flow proceeds to step 642, whereupon a channel with an outdated screen capture is tuned, and a screen capture is performed at step 643. A display update is performed at step 644, and operations from step 615 to step 632 are performed, as set forth above.

When a key input associated with the remote 300 has been received at step 632, a determination is made at step 633 as to whether the enter key 318 has been pressed by the associated user; that is, a determination is made as to whether the signal received from the remote 300 corresponds to a signal associated with the enter key 318. When the enter key 318 has been selected, a determination is made at step 634 as to whether the currently selected channel box 104 or 204 corresponds to the currently viewed channel. When a positive determination is made at step 634, the channel browser display 102 or 202 is exited and the display unit 100 or 200 displays the channel. A negative determination at step 635 results in the tuning of the display unit 100 or 200 to the channel associated with the selected channel box 104 or 204 at step 635, whereupon operations terminate at step 645.

Upon a determination that the enter key 318 has not been input at step 633, flow proceeds to step 636, whereupon a determination is made as to whether an arrow key 310-316 has been pressed. When no arrow key 310-316 has been pressed, the key input 302-306 is capable of being ignored and the user input component of FIGS. 6A, 6B, and 6C terminates at step 645. When an arrow key 310-316 has been pressed, the key press is translated at step 637 to a numeric value, and calculations are performed to the current channel index. A determination is then made at step 638 as to whether the index is outside a preselected data range. A positive determination at step 638 prompts the disregarding of the input at step 645. When the index is within the data range, a determination is made as to whether the index is outside the display range at step 639. When the index is outside the display range as determined at step 639, the display range is changed at step 640 to include the current channel index. Flow then proceeds to step 641 and operations continue as set forth above. Upon a determination at step 639 that the index is not outside the display range, operations proceed to step 641. The methodology from step 641 onward is discussed in greater detail above.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally, and equitably entitled.

What is claimed is:

1. A system for displaying and navigating a graphical two-dimensional array of a plurality of available channels on an associated display unit, comprising:
  a processor comprising control logic configured to generate a two-dimensional array of a first plurality of channel boxes on the associated display unit in accordance with a size associated therewith;
  wherein the control logic is configured to render the first plurality of channel boxes on the associated display as a foreground to a selected video channel shown in background relative to the array of the first plurality of channel boxes;
  wherein the control logic is configured to receive input signals corresponding to a plurality of available channels;
  wherein the control logic is configured to parse a plurality of the input signals so as to acquire channel identification data associated with each of selected ones of the plurality of available channels;
  wherein the control logic is configured to capture image data associated with the channel corresponding to the channel identification data parsed from the selected ones of the input signals;
  wherein the control logic is configured to populate the plurality of channel boxes in accordance with the acquired channel identification data and captured image data corresponding thereto;
  wherein the control logic is configured to receive page selection data representative of a page change command for altering the array of the first plurality of channel boxes displayed via the associated display unit; and
  wherein the control logic is configured to alter the array of the first plurality of channel boxes displayed via the associated display unit in accordance with the received page selection data by replacing the first plurality of channel boxes in the array with a second plurality of channel boxes as an altered array, wherein the second plurality of channel boxes is different than the first plurality of channel boxes,
  wherein only one channel box of the first plurality of channel boxes is repeated on the altered array of the second plurality of channel boxes displayed via the associated unit thereby maintaining context therebetween.

2. The system for displaying and navigating a graphical two-dimensional array of a plurality of available channels on an associated display unit of claim 1, further comprising:
  the control logic configured to retrieve pre-rendered logo indicia corresponding to at least one channel; and
  wherein the control logic is configured to populate at least one channel box associated with the at least one channel in accordance with the retrieved pre-rendered logo indicia.

3. The system for displaying and navigating a graphical two-dimensional array of a plurality of available channels on an associated display unit of claim 2, further comprising:
  the control logic configured to receive user channel selection data corresponding to a selected one of the plurality of populated channel boxes displayed on the associated display unit; and
  wherein the control logic is configured to generate indicia associated with the selected one of the plurality of populated channel boxes in accordance with received user input data.

4. The system for displaying and navigating a graphical two-dimensional array of a plurality of available channels on an associated display unit of claim 1, further comprising:
  the control logic configured to calculate location data corresponding to a location of each of the plurality of channel boxes in accordance with a selected layout of the array for display on the associated display unit; and
  wherein the control logic is configured to generate the two-dimensional array of the plurality of channel boxes on the associated display unit in accordance with the calculated location data.

5. The system for displaying and navigating a graphical two-dimensional array of a plurality of available channels on an associated display unit of claim 1, further comprising:
  the control logic configured to receive user label data corresponding to a user selected label associated with at least one of the plurality of available channels; and
  wherein the control logic is configured to store user label data in association with the at least one selected available channel;
  wherein the control logic is further configured to populate the at least one channel box in accordance with the received user label data, acquired channel identification data, and captured image data corresponding thereto.

6. A method for displaying and navigating a graphical two-dimensional array of a plurality of available channels on an associated display unit, comprising the steps of:
   generating a two-dimensional array of a plurality of channel boxes on the associated display unit in accordance with a size associated therewith as a foreground to a selected video channel shown in background on the associated display relative to the array of the plurality of channel boxes;
   receiving input signals corresponding to a plurality of available channels;
   parsing at least one input signal so as to acquire first channel identification data associated with each of the plurality of available channels;
   capturing first image data associated with the channel corresponding to the first channel identification data parsed from the at least one input signal;
   populating the plurality of channel boxes with the acquired first channel identification data and captured first image data corresponding thereto as first content;
   receiving page selection data representative of a page change command for altering the first content of the array of channel boxes displayed via the associated display unit; and
   altering the array of channel boxes displayed via the associated display unit in accordance with the received page selection data by replacing the first content of the array of channel boxes with second content as an altered array,
   wherein the first content of only one channel box on the page of the array of channel boxes is repeated on the altered array of channel boxes displayed via the associated unit thereby maintaining context therebetween.

7. The method for displaying and navigating a graphical two-dimensional array of a plurality of available channels on an associated display unit of claim 6, further comprising the steps of:
   retrieving pre-rendered logo indicia corresponding to at least one channel; and
   populating at least one channel box associated with the at least one channel in accordance with the retrieved pre-rendered logo indicia.

8. The method for displaying and navigating a graphical two-dimensional array of a plurality of available channels on an associated display unit of claim 7, further comprising the steps of:
   receiving user channel selection data corresponding to a selected one of the plurality of populated channel boxes displayed on the associated display unit; and
   generating indicia associated with the selected one of the plurality of populated channel boxes in accordance with received user input data.

9. The method for displaying and navigating a graphical two-dimensional array of a plurality of available channels on an associated display unit of claim 6, further comprising the steps of:
   calculating location data corresponding to a location of each of the plurality of channel boxes in accordance with a selected layout of the array for display on the associated display unit; and
   generating the two-dimensional array of the plurality of channel boxes on the associated display unit in accordance with the calculated location data.

10. The method for displaying and navigating a graphical two-dimensional array of a plurality of available channels on an associated display unit of claim 6, further comprising the steps of:
   receiving user label data corresponding to a user selected label associated with at least one of the plurality of available channels;
   storing user label data in association with the at least one selected available channel; and
   wherein the step of populating the at least one channel box further includes the step of populating the at least one channel box in accordance with the received user label data, acquired channel identification data, and captured image data corresponding thereto.

11. The system for displaying and navigating a graphical two-dimensional array of a plurality of available channels on an associated display unit of claim 1 wherein:
   the control logic is configured to determine a resolution parameter of the image data corresponding to the plurality of channel boxes, and to selectively capture portions of the image data as the captured image data in accordance with the respective determined resolution parameter.

12. The system for displaying and navigating a graphical two-dimensional array of a plurality of available channels on an associated display unit of claim 11 wherein the control logic is configured to adjust an aspect ratio of the image data in accordance with the respective determined resolution parameter.

13. The method for displaying and navigating a graphical two-dimensional array of a plurality of available channels on an associated display unit of claim 6, further comprising:
   determining a resolution parameter of the image data corresponding to the plurality of channel boxes; and,
   selectively capturing portions of the image data as the captured image data in accordance with the respective determined resolution parameter.

14. The method for displaying and navigating a graphical two-dimensional array of a plurality of available channels on an associated display unit of claim 13, further comprising:
   adjusting an aspect ratio of the image data in accordance with the respective determined resolution parameter.

15. A method for displaying and navigating a plurality of available channels, the method comprising:
   generating a plurality of channel boxes on an associated display unit;
   receiving input signals corresponding to a plurality of available channels;
   parsing at least one input signal so as to acquire first channel identification data associated with the plurality of available channels;
   capturing first image data associated with the channel corresponding to the first channel identification data parsed from the at least one input signal;
   populating the plurality of channel boxes with the acquired first channel identification data and captured first image data corresponding thereto as first content;
   receiving page selection data representative of a page change command for altering the first content of the plurality of channel boxes displayed via the associated display unit; and,
   altering the plurality of channel boxes displayed via the associated display unit in accordance with the received page selection data by selectively replacing the first content of the plurality of channel boxes with second content as an altered plurality of channel boxes, wherein the first content of only one channel box on the page of the plurality of channel boxes is repeated on the altered plurality of channel boxes displayed via the associated unit thereby maintaining context between the first and second content of the plurality of channel boxes.

16. The method for displaying and navigating a plurality of available channels of claim 15, further comprising:
  retrieving pre-rendered logo indicia corresponding to at least one channel; and
  populating at least one channel box associated with the at least one channel in accordance with the retrieved pre-rendered logo indicia.

17. The method for displaying and navigating a plurality of available channels of claim 16, further comprising:
  receiving user channel selection data corresponding to a selected one of the plurality of populated channel boxes displayed on the associated display unit; and
  generating indicia associated with the selected one of the plurality of populated channel boxes in accordance with received user input data.

18. The method for displaying and navigating a plurality of available channels of claim 15, further comprising:
  calculating location data corresponding to a location of each of the plurality of channel boxes in accordance with a selected layout for display on the associated display unit; and
  generating an arrangement of the plurality of channel boxes on the associated display unit in accordance with the calculated location data.

19. The method for displaying and navigating a plurality of available channels of claim 15, further comprising:
  receiving user label data corresponding to a user selected label associated with at least one of the plurality of available channels;
  storing user label data in association with the at least one selected available channel; and
  wherein the step of populating the at least one channel box further includes the step of populating the at least one channel box in accordance with the received user label data, acquired channel identification data, and captured image data corresponding thereto.

20. The method for displaying and navigating a plurality of available channels of claim 15, further comprising:
  determining a resolution parameter of the image data corresponding to the plurality of channel boxes; and,
  selectively capturing portions of the image data as the captured image data in accordance with the respective determined resolution parameter.

* * * * *